(12) United States Patent
Hayama et al.

(10) Patent No.: US 6,280,338 B1
(45) Date of Patent: Aug. 28, 2001

(54) PLUNGING CONSTANT VELOCITY UNIVERSAL JOINT FOR PROPELLER SHAFT

(75) Inventors: Yoshihiko Hayama; Haruo Nagatani, both of Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/553,481

(22) Filed: Apr. 20, 2000

(30) Foreign Application Priority Data

Apr. 28, 1999 (JP) .................................................. 11-122358

(51) Int. Cl.$^7$ ........................................................ F16C 3/02
(52) U.S. Cl. .............................................. 464/146; 464/906
(58) Field of Search .................................. 464/141, 142, 464/143, 144, 145, 146, 906

(56) References Cited

U.S. PATENT DOCUMENTS

| | | | |
|---|---|---|---|
| 4,533,339 | * 8/1985 | Girguis | 464/146 |
| 5,106,343 | * 4/1992 | Sakaguchi et al. | 464/146 |
| 5,632,683 | 5/1997 | Fukumura et al. | 464/144 |
| 5,853,328 | * 12/1998 | Kobayashi et al. | 464/145 |

FOREIGN PATENT DOCUMENTS

| | | |
|---|---|---|
| 0 844 412 | 5/1998 | (EP) . |
| 10-073129 | * 3/1998 | (JP) . |

* cited by examiner

*Primary Examiner*—Lynne H. Browne
*Assistant Examiner*—Aaron M Dunwoody
(74) *Attorney, Agent, or Firm*—Arent Fox Kinter Plotkin & Kahn

(57) ABSTRACT

In an inner joint member (20) that has eight guide grooves (24) formed to extend in the axial direction located at equal intervals in the circumferential direction on the outer circumference (22) of spherical shape and a fitting portion (26) provided on the inner circumference for the purpose of coupling with a stub shaft, ratio of width W between the center of curvature $O_2$ of the outer circumference (22) of spherical shape and the end face to the pitch circle diameter Ds of the fitting portion (26) is set as $W/D_s > 0.27$, thereby making it possible for a plunging constant velocity universal joint for propeller shaft of the vehicle to be lighter in weight, more compact and is capable of contributing to the improvement of the NVH characteristic of the vehicle.

2 Claims, 5 Drawing Sheets

PLUNGING CONSTANT VELOCITY UNIVERSAL JOINT FOR PROPELLER SHAFT

BACKGROUND OF THE INVENTION

1. Field of the Invention

The present invention relates to a plunging constant velocity universal joint for the propeller shaft of an automobile.

A propeller shaft is used to transmit torque from a transmission to a differential gear set in a four-wheel drive (4WD) vehicle or a front-engine, rear-drive (FR) vehicle. While the use of 2-joint type propeller shafts is common, 3-joint type and 4-joint type are also used depending on the vehicle structure and specification requirements.

The constant velocity universal joints are roughly divided into fixed type that allows for only angular displacement between two shafts, and plunging type that allows for both angular displacement and axial displacement (plunging), that are selected and used according to the operating conditions, application and other factors. The present invention concerns with a double offset type constant velocity universal joint, among the plunging types, that is specifically designed for the propeller shaft of an automobile, and is reduced in weight and size.

2. Description of the Prior Art

Cardan joint (universal joint employing a cross spider) is predominantly used for the propeller shafts of 4DW vehicles and FR vehicles, except for some luxury models. However, non-uniformity of torque transmission characteristic of the Cardan joint leads to poor NVH (commonly known as noise, vibration and harshness) characteristics. Also the Cardan joint does not have a plunging mechanism, a slide spline (or serration) is required in the propeller shaft to absorb the geometrical changes generated by bounding of the vehicle or the like. However, since this portion has significantly large play and high sliding resistance, unusual vibration such as stick slip may be generated when vibration or sliding occurs during rotation. Thus it has been known that ride comfort of the vehicle is compromised for the passenger who is subjected to uncomfortable noise and/or vibration. Accordingly, constant velocity universal joints have been employed for the propeller shaft as means for improving the NVH characteristics.

In the automobile power-trains, there have been many examples of using constant velocity universal joints in the drive shafts, and majority of the constant velocity universal joints used in the propeller shafts have been those designed for the use in the drive shaft. However, when the operating conditions are compared between the propeller shafts and the drive shafts, the torque applied to a propeller shaft is about a half that of a drive shaft, and the practical range of the operating angles of the propeller shaft is narrower than that of the drive shaft. Thus use of a constant velocity universal joint designed for a drive shaft on a propeller shaft may be regarded as over specification compared to the specification requirements for the propeller shaft, with further improvements remaining to be done in terms of weight reduction, size reduction and cost cut-down. In addition, since the propeller shaft rotates at a higher speed than the drive shaft, the joint is desired to be more compact to facilitate high-speed rotation.

SUMMARY OF THE INVENTION

An object of the present invention is, accordingly, to provide a plunging constant velocity universal joint for propeller shaft that is lighter in weight, more compact and is capable of contributing to the improvement of the NVH characteristic of the vehicle.

The present invention aims at improving a light weight and compact constant velocity universal joint designed for a drive shaft, thereby to further reduce the weight and size thereof by redesigning specifically for the use in a propeller shaft only.

According to an embodiment of the invention, a plunging constant velocity universal joint for propeller shaft comprises an outer joint member having eight straight guide grooves formed in the axial direction on the inner circumference thereof having a cylindrical shape, an inner joint member having eight straight guide grooves formed in the axial direction on the outer circumference thereof having a spherical shape and teeth formed on the inner circumference thereof for the purpose of coupling with a shaft, eight balls disposed in ball tracks formed by the guide grooves of the outer joint member and the guide grooves of the inner joint member, and a cage having hollows for encasing the balls, an outer circumference of convex spherical shape guided in contact by the inner circumference of the outer joint member, an inner circumference of concave spherical shape guided in contact by the outer circumference of the inner joint member, wherein center of curvature of the outer circumference of the cage and center of curvature of the inner circumference of the case are offset from the center of the hollow in the axial direction to the opposite sides (double offset), while the ratio of width W, between the center of curvature of the inner joint member and the end face, to the pitch circle diameter Ds of fitting portion of the inner joint member is set as $W/D_s > 0.27$.

The constant velocity universal joint can be made lighter in weight and more compact through redesigning specifically for the use in a propeller shaft. By making the width of the inner joint member smaller than that of the conventional one, in particular, reduction in the quantity of material used and reduction in weight can be achieved. Since the double offset type constant velocity universal joint for propeller shaft requires a narrower range of operating angles, less strength and less depth of tracks than those for a drive shaft, width of the inner joint member can be made smaller thus making it possible to set such a width that allows weight reduction. The reason for setting a value greater than 0.27, for the ratio (W/Ds) of width W between the center of curvature of the inner joint member and the end face to the pitch circle diameter Ds of the fitting portion of the inner joint member, is because it was found that the operating angle required for the constant velocity universal joint for propeller shaft can be allowed for when the ratio (W/Ds) is greater than 0.27. The value of W/Ds is desirable to be as small as possible for the purpose of reducing weight and size, and in this regard there is no substantial rationale for setting the lower limit for the value of W/Ds. However, it is necessary to set the lower limit in order to ensure the movement of the balls that is required to allow for the desired operating angle. Upper limit is set to the same level as in the conventional one.

The double offset type joints have particularly lower slide resistance than the slide-spline. Thus it is advantageous to mount the double offset type constant velocity universal joint on a propeller shaft with regard to the improvement of the NVH characteristic as well.

The allowable operating angle of the joint is preferably about 15°. Since the propeller shaft operates with a smaller normal operating angle, it can be designed with restricted operating angle for size reduction. Thus width of the inner joint member can be reduced since the ball contact area on the inner and outer track, namely the track axial length requirement of the ball movement, can be reduced by restricting the operating angle. More specifically, such a width of the inner joint member that allows for the operating angle of 15° can be obtained by setting a value greater than 0.27 for the ratio W/Ds of width W between the center of curvature of the inner joint member and the end face to the pitch circle diameter Ds of the fitting portion of the inner joint member.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
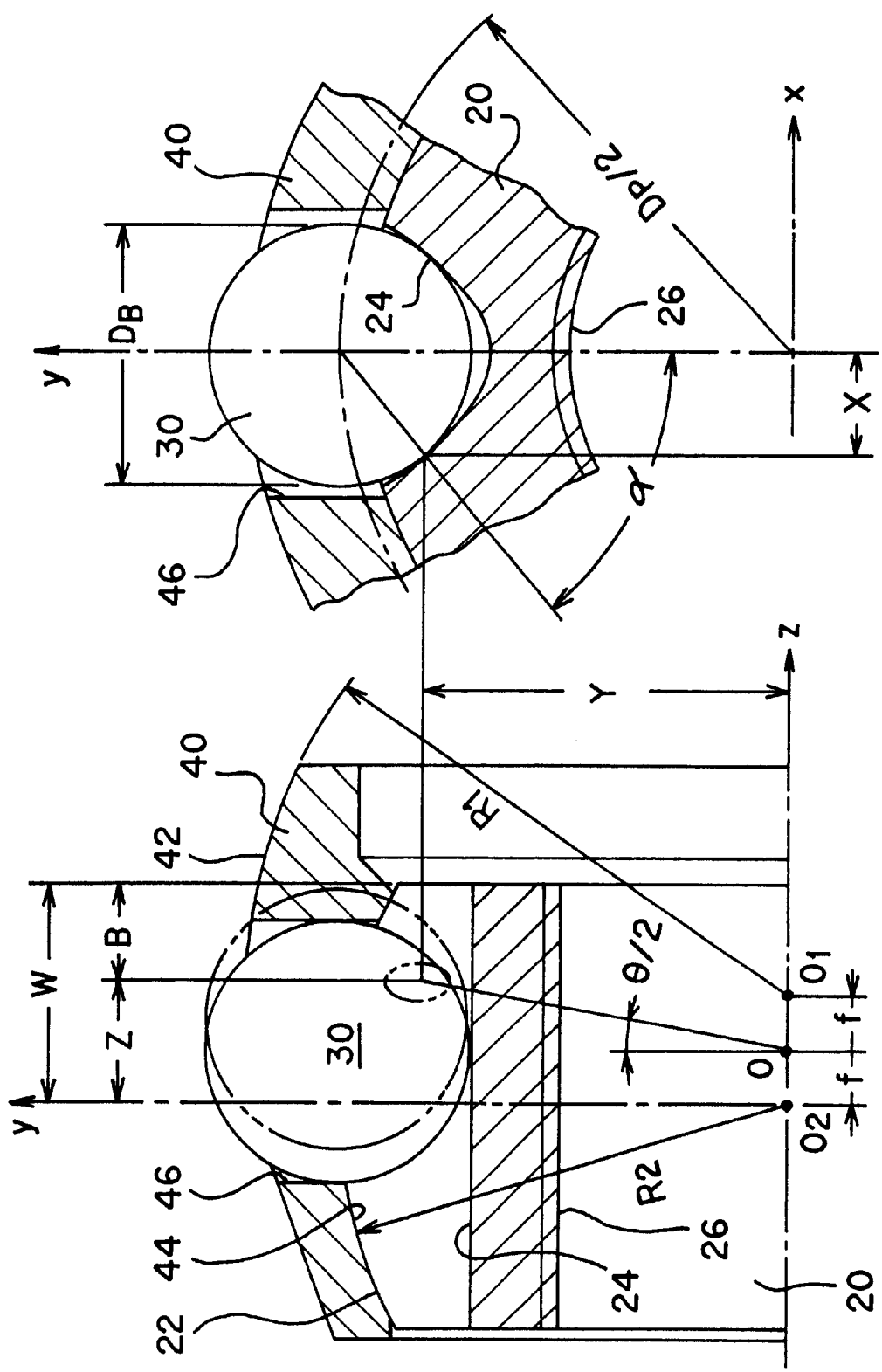
FIG. 1A is an enlarged side sectional view and FIG. 1B is an enlarged front sectional view of a key portion of an inner joint member for explaining an embodiment according to the present invention.
Figure 2:
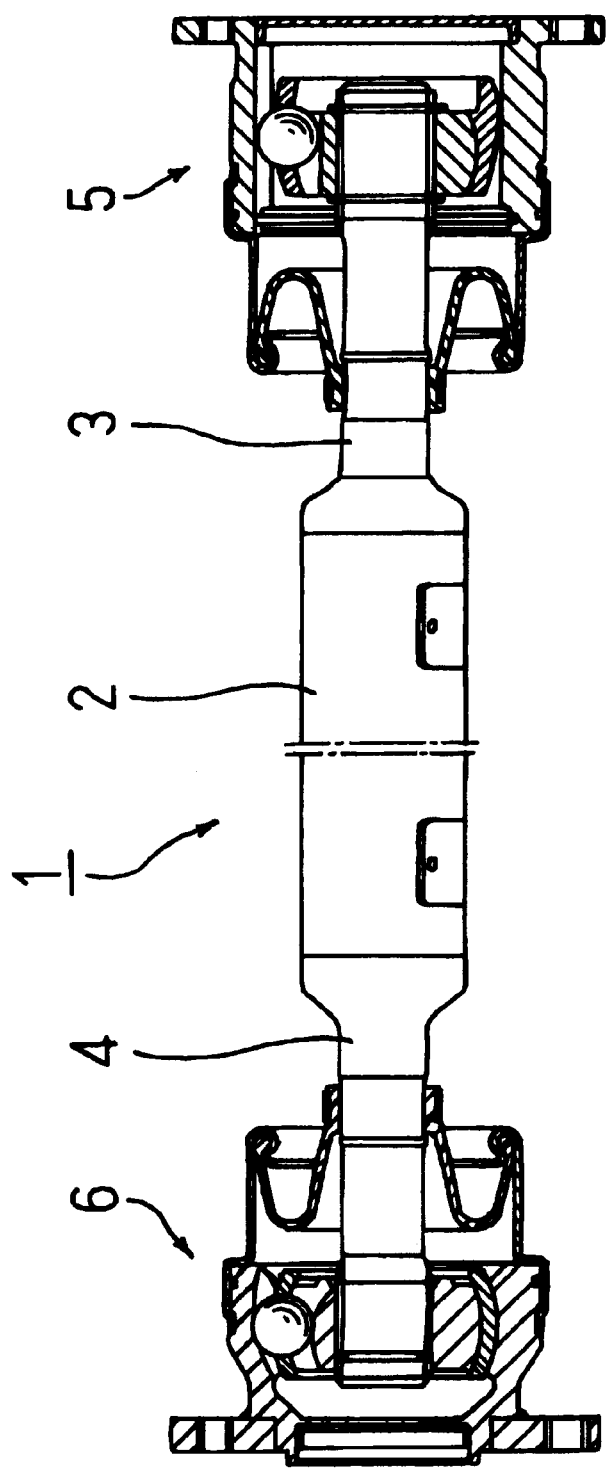
FIG. 2 is a longitudinal view of a propeller shaft showing a constant velocity universal joint being cut away.
Figure 3:
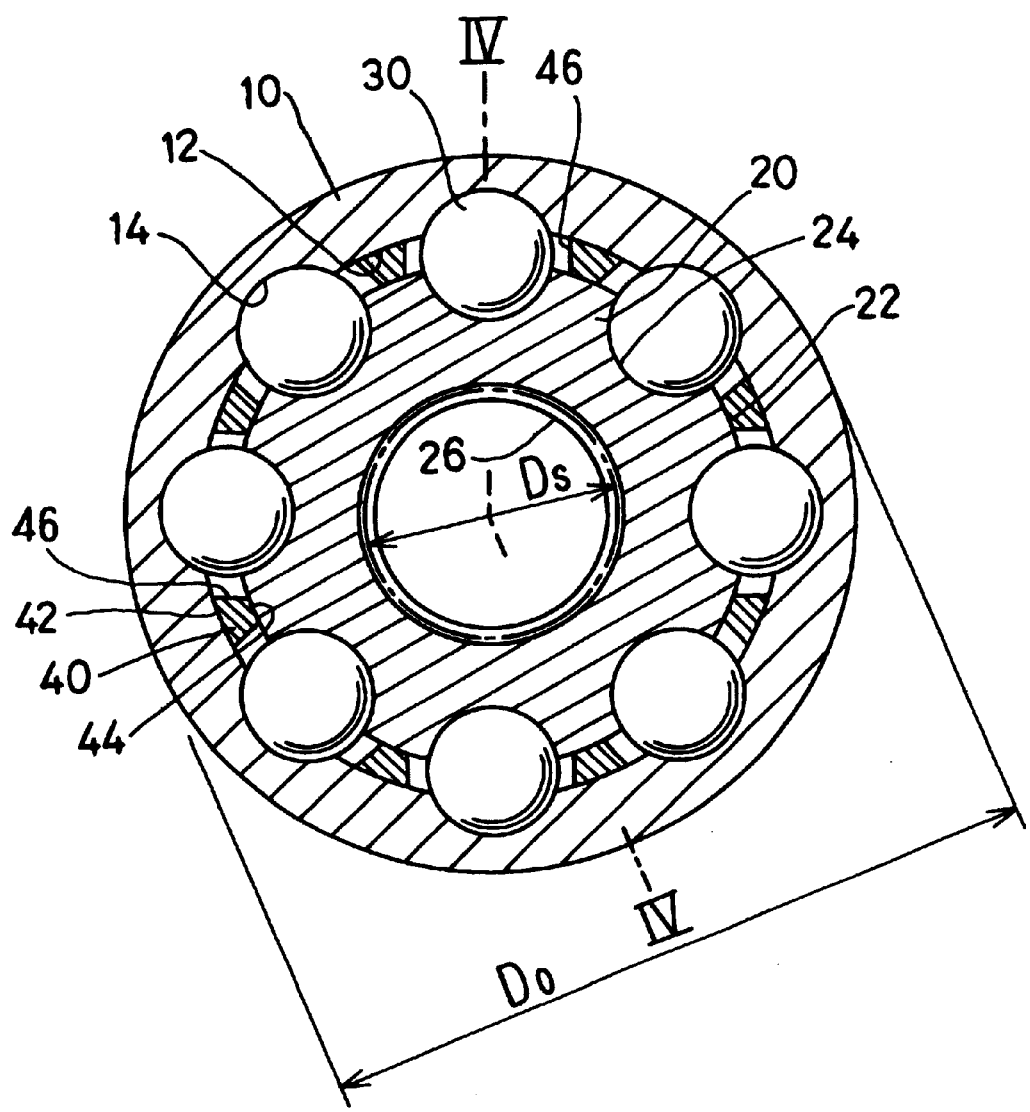
FIG. 3 is across sectional view of a double offset type-constant velocity universal joint.
Figure 4:
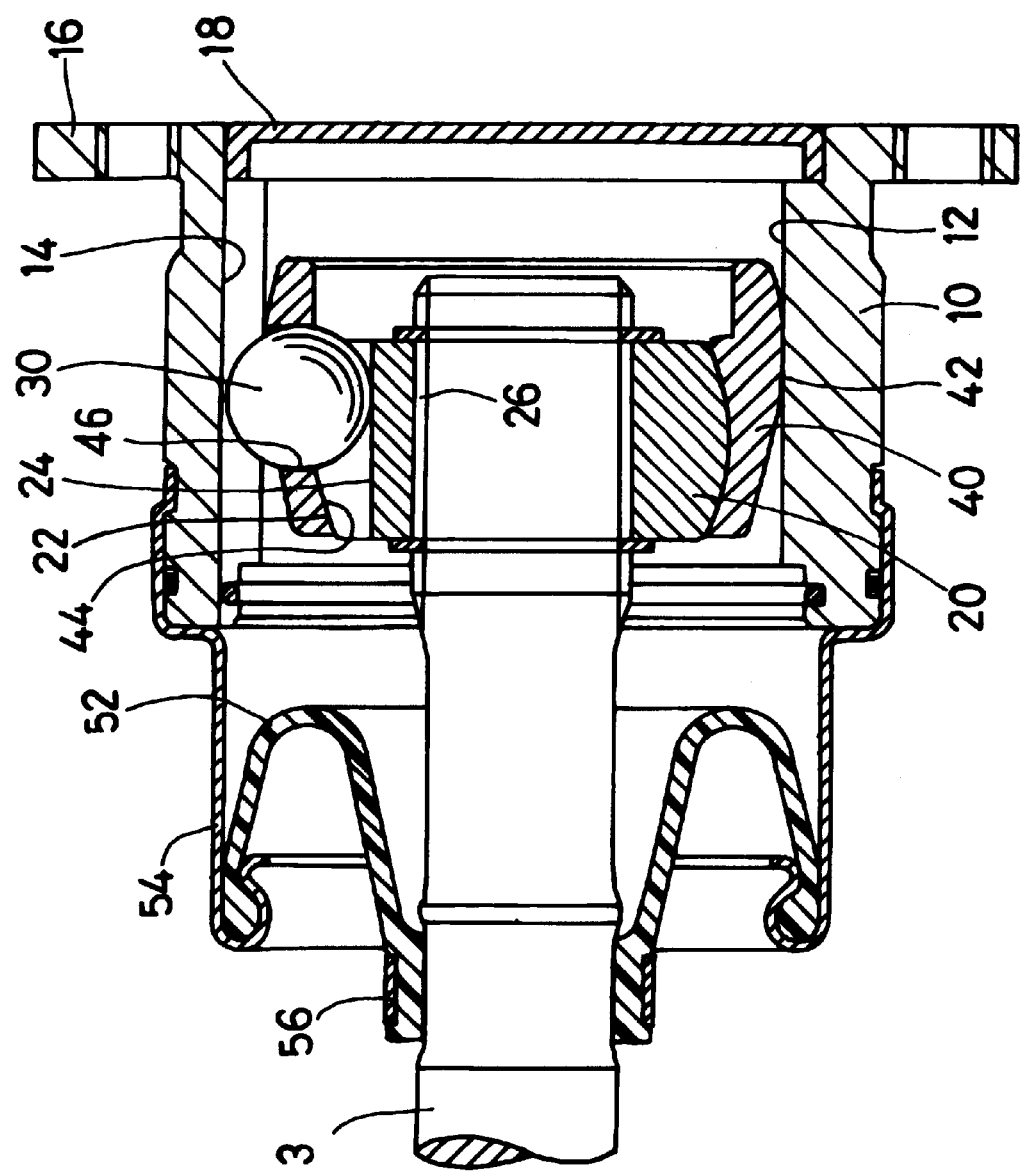
FIG. 4 is a longitudinal sectional view taken along line IV–IV of FIG. 3.
Figure 5:
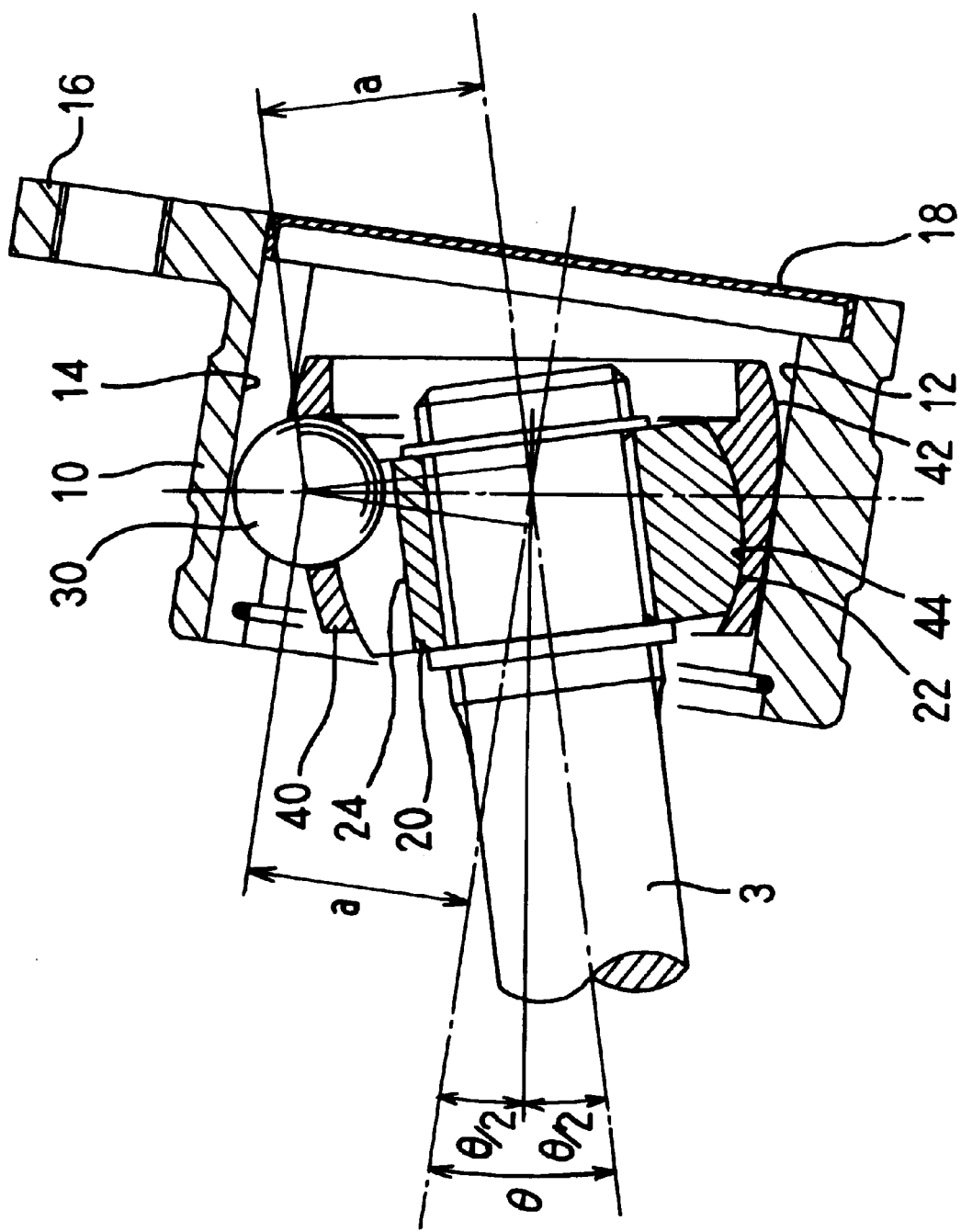
FIG. 5 is a longitudinal sectional view similar to FIG. 4 under an operating angle.

Now an embodiment of the present invention will be described below with reference to accompanying drawings. FIG. 1A is an enlarged side sectional view and FIG. 1B is an enlarged front sectional view of a key portion for explaining the embodiment of the present invention. FIG. 2 shows the overview of a propeller shaft. FIGS. 3 through 5 show a double offset type plunging constant velocity universal joint, with FIG. 3 showing the cross sectional view, FIG. 4 showing the longitudinal sectional view and FIG. 5 showing the longitudinal sectional view under an operating angle of θ.

First, overall constitution of the propeller shaft will be described by taking reference to FIG. 2. The propeller shaft 1 is constructed by attaching constant velocity universal joints 5, 6 to an intermediate shaft 2 on both ends thereof. The constant velocity universal joint 5 located at the right hand side in the drawing is of plunging type, and the constant velocity universal joint 6 on the left hand side is of fixed type. Stub shafts 3, 4 are fastened integrally on the intermediate shaft 2 on both sides thereof, while inner joint members of the constant velocity universal joints 5, 6 are connected to the stub shafts 3, 4 by serration or spline coupling, with retainer rings attached to prevent disconnection. The stub shafts 3, 4 are normally solid shafts made of steel and the intermediate shaft 2 is a hollow shaft made of steel or fiber-reinforced plastic (FRP).

The double offset type constant velocity universal joint, one example of the plunging constant velocity universal joint 5, comprises an outer joint member 10, an inner joint member 20, balls 30 and a cage 40 as major components thereof, as shown in FIG. 3 and FIG. 4.

The outer joint member 10 has a cylindrical shape and eight guide grooves 14 formed thereon to extend in the axial direction located at equal intervals in the direction of circumference of an inner circumference 12. Formed on one end of the outer joint member 10 is a flange 16, while an opening on the side of the flange 16 is plugged with an end plate 18. The outer joint member 10 is coupled with the shaft of a transmission or a differential gear set of an automobile via the flange 16. Alternatively, in the case of 3-joint or 4-joint type propeller shaft, the outer joint member 10 may also be coupled with another intermediate shaft.

The inner joint member 20 has an outer circumference 22 of convex spherical shape, and eight guide grooves 24 formed thereon to extend in the axial direction and located at equal intervals in the direction of circumference thereof. The inner joint member 20 is joined with the stub shaft 3 via a fitting portion 26 that has toothed configuration (serration or spline).

The guide grooves 14 of the outer joint member 10 and the guide grooves 24 of the inner joint member 20 mate with each other to form ball tracks, with one ball 30 encased in each ball track. The ball 30, being interposed between the guide grooves 14, 24, transmits torque between the outer joint member 10 and the inner joint member 20. The balls 30 are encased in hollows 46 formed at equal intervals along the circumference of the cage 40.

A convex spherical outer circumference 42 of the cage 40 makes linear contact with a cylindrical inner circumference 12 of the outer joint member 10. A concave spherical inner circumference 44 of the cage 40 makes spherical surface contact with the convex spherical outer circumference 24 of the inner joint member 20. Center of curvature $O_1$ of the convex shperical outer circumference 42 of the cage 40 and center of curvature $O_2$ of the concave spherical inner circumference 44 thereof are offset from the center O of the joint by an equal distance f in the axial direction to the opposite sides (refer to FIGS. 1A and 1B).

When the joint transmits torque while taking an operating angle θ, as shown in FIG. 5, the cage 40 rotates and moves to the position of the ball 30 that rolls over the ball track according to the inclination of the inner joint member 20, thereby always positioning all the balls 30 in a plane perpendicular to a bisection line of the operating angle θ. As a result, distance between the center of the ball 30 and the axial line of the outer joint member 10 is made equal to distance between the center of the ball 30 and the axial line of the inner joint member 20, thus maintaining the constant velocity of the joint rotation. Moreover, when the outer joint member 10 and the inner joint member 20 move relatively with each other in the axial direction, there occurs slippage between the outer circumference 42 of the cage 40 and the inner circumference 12 of the outer joint member 10 that are in linear contact, thereby making smooth movement in the axial direction (plunging) possible.

Attached on an opening end located opposite to the end plate 18 of the outer joint member 10 is a dust boot 52 made of a flexible material. The dust boot 52 is not shown in FIG. 5. The dust boot 52 is installed by inserting an end of larger diameter thereof into an end of an adapter 54 made of a metal that is fitted into the outer joint member 10 on the other end thereof, and fastening an end of smaller diameter of the dust boot 52 to the periphery of the stub shaft 3 by means of a boot band 56. The dust boot 52 and the end plate 18 seal the inside of the joint, thereby preventing a grease that fills the inside of the joint from leaking and foreign matters from entering the inside.

FIGS. 1A and 1B show the inner joint member 20 and the balls 30 in contact with each other. Position of the ball 30 when the joint takes the maximum allowable operating angle is indicated by an alternate dash and two dots line. A point (X, Y, Z) where the ball 30 touches the guide groove 24 is given as follows.

$$X^2+(Y-D_p/2)^2=(D_B/2)^2$$

$$X=D_B/2 \cdot \sin\alpha$$

$$Y=D_p/2-D_B/2 \cdot \cos\alpha$$

$$Z=f+Y \cdot \tan(\theta/2)$$

where $D_p$ is the pitch circle diameter of the ball 30, $D_B$ is the diameter of the ball 30, f is the offset distance and $\alpha$ is the contact angle between the ball 30 and the guide groove 24.

When a torque is applied to the joint, the ball 30 does not experience override or fall-off as long as the contact oval area (indicated by alternate dash and two dots line) found at the contact point remains on the side wall face of the guide groove 24. Assume the margin at this time be B, then width W between the center $O_2$ of curvature of the inner joint member 20 and the end face of the larger diameter side of cage of the inner joint member 20 may be (Z+B) or greater.

When width W with the margin B taken into consideration with the allowable operating angle set to 15° is determined and the ratio W/Ds of width to the pitch circle diameter Ds of the fitting portion 26 of the inner joint member 20 is calculated, with the results shown in Table 1. The outer diameter ratio in Table 1 represents the extent of size reduction based on the outer diameter $D_o$ of the outer joint member 10. It is shown that the size can be reduced by at least two levels by setting the ratio W/Ds to a value greater than 0.27. Ball diameters are all reduced by four levels. The size (nominal) refers to the minimum shaft diameter, and one having minimum shaft diameter of 0.75 is referred to by the nominal size of 75.

TABLE 1

| | Size (Nominal) | 75 | 87 | 100 |
|---|---|---|---|---|
| W | Article according to the present invention | 5.87 | 7.29 | 8.53 |
| | Article according to prior art | 10.5 | 10.975 | 14.0 |
| W/Ds | Article according to the present invention | 0.274 | 0.284 | 0.299 |
| | Article according to prior art | 0.489 | 0.427 | 0.489 |
| Outer diameter ratio | | 2-level size reduction | 3-level size reduction | 3-level size reduction |
| Outer diameter | | φ69.0→ φ61.5 | φ79.0→ φ69.0 | φ89.0→ φ79.0 |
| Ball diameter ratio | | 4-level size reduction | 4-level size reduction | 4-level size reduction |

In the double offset type constant velocity universal joint of this embodiment, number of the balls 30 is eight (refer to FIG. 4) so that one ball receives a smaller proportion of the total load on the joint than in the case of using six balls. As a consequence, it is made possible to make the diameter DB of the ball 30 smaller than that of the conventional joint of the same nominal size while keeping the wall thickness of the outer joint member 10 and the wall thickness of the inner joint member 20 similar to those of the conventional joint. It is also made possible to make the value of $D_B/Ds$ maller than that of the conventional joint (of which value is commonly $D_B/D_s \geq 3.2$) that has the same nominal size while keeping strength, load bearing capability and durability similar to or greater than those of the conventional joint, thus reducing the outer dimension $D_o$ further. When the pitch diameter $D_s$ of the fitting portion 26 of the inner joint member 20 is made similar to that of the conventional joint, the outer diameter $D_o$ can be reduced by three levels in terms of the nominal size. It is also verified in an experiment that the joint of the present invention generates less heat than the conventional joint.

As discussed above, in the plunging constant velocity universal joint for propeller shaft of the present invention, by setting the ratio W/Ds of width W between the center of curvature $O_2$ of the inner joint member 20 and the end face of the larger cage diameter side of the inner joint member 20 to the pitch circle diameter Ds of the fitting portion 26 of the inner joint member 20 as W/$D_s$>0.27, width of the inner joint member in the axial direction can be made smaller than the conventional joint, thereby reducing the weight, size and material cost.

Moreover, the propeller shaft provided with the plunging constant velocity universal joint of the present invention is reduced in weight and size in the portion of the joint, and is therefore better in the high-speed rotation performance and contributes to the improvement of the NVH characteristic of the vehicle.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A plunging constant velocity universal joint for a propeller shaft comprising:

an outer joint member with eight straight guide grooves formed in an axial direction on an inner circumference thereof having a cylindrical shape;

an inner joint member with eight straight guide grooves formed in the axial direction on an outer circumference thereof having a spherical shape and teeth formed on an inner circumference thereof for the purpose of coupling with a shaft;

eight balls disposed in ball tracks formed by the guide grooves of the outer joint member and the guide grooves of the inner joint member; and a cage having an outer circumferential surface, an inner circumferential surface and hollows for encasing the balls, the outer circumferential surface of convex spherical shape guided in contact by the inner circumference of the outer joint member, and the inner circumferential surface of concave spherical shape guided in contact by the outer circumference of the inner joint member, center of curvature of the outer circumference of the cage and center of curvature of the inner circumference of the cage being offset from the center of the hollow in the axial direction to the opposite sides, wherein the ratio of width W between the center of curvature of the inner joint member and an end face to a pitch circled diameter Ds of a fitting portion of the inner joint member is set as W/$D_s$>0.27.

2. A plunging constant velocity universal joint for propeller shaft as described in claim 1 wherein allowable operating angle of the joint is 15°.

* * * * *